United States Patent
Matsumoto et al.

(10) Patent No.: US 12,503,011 B2
(45) Date of Patent: Dec. 23, 2025

(54) PLACEMENT STRUCTURE OF SEAT FOR VEHICLE

(71) Applicant: MAZDA MOTOR CORPORATION, Hiroshima (JP)

(72) Inventors: Kenji Matsumoto, Hiroshima (JP); Miho Kurata, Hiroshima (JP); Sakayu Terada, Hiroshima (JP); Daisuke Yamada, Hiroshima (JP); Yuki Hanazawa, Hiroshima (JP); Naoko Motoyoshi, Hiroshima (JP); Aoi Fujimoto, Hiroshima (JP); Junsuke Inoue, Hiroshima (JP); Takashi Suzuki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 486 days.

(21) Appl. No.: 18/173,160

(22) Filed: Feb. 23, 2023

(65) Prior Publication Data

US 2024/0109459 A1    Apr. 4, 2024

(30) Foreign Application Priority Data

Sep. 30, 2022    (JP) ................. 2022-157277

(51) Int. Cl.
*B60N 2/005*    (2006.01)
*B60N 2/64*    (2006.01)

(52) U.S. Cl.
CPC ............. *B60N 2/005* (2013.01); *B60N 2/646* (2013.01)

(58) Field of Classification Search
CPC ........ B60N 2/005; B60N 2/015; B60N 2/646; B60N 2/012; B60N 2/502

(Continued)

(56) References Cited

U.S. PATENT DOCUMENTS 8,308,235 B2 * 11/2012 Ellison ................. B60N 2/7005
                                                          297/452.21
9,033,420 B2 * 5/2015 Lievestro ............... B64D 11/06
                                                          297/452.48

(Continued)

FOREIGN PATENT DOCUMENTS

| JP | H02-85635 U | 7/1990 | |
| JP | 2009056190 A | * 3/2009 | ............... B60N 2/70 |
| JP | 2020-138634 A | 9/2020 | |

OTHER PUBLICATIONS

Honda (JP 2009056190 A), machine translation (Year: 2009).*

(Continued)

*Primary Examiner* — Amy R Weisberg
*Assistant Examiner* — Wenwei Zhuo
(74) *Attorney, Agent, or Firm* — Studebaker Brackett PLLC

(57) ABSTRACT

A seat cushion is formed integrally by a body pad portion, an outer peripheral edge portion, and a connection portion. The outer peripheral edge portion protrudes toward a floor panel from the outer peripheral edge portion in a plan view and contacts a floor panel at its lower face. The connection portion is provided to protrude toward the floor panel at a portion which is separated from a front-side part of the outer peripheral edge portion and a rear-side part of the outer peripheral edge portion, respectively. The connection portion connects the floor panel and the body pad portion. A portion between the front-side part and the rear-side part of the outer peripheral edge portion in a vehicle longitudinal direction is a separation portion where a lower face of the seat cushion faces an upper face of the floor panel with a gap.

11 Claims, 12 Drawing Sheets

(58) Field of Classification Search
USPC .............. 296/63, 65.02; 297/452.21, 452.26, 297/452.27, 452.24, 452.23
See application file for complete search history.

(56) References Cited

U.S. PATENT DOCUMENTS

2009/0146472 A1* 6/2009 Galbreath .............. B60N 2/646
  297/250.1
2022/0324520 A1* 10/2022 Nakamura ............. B62D 25/20

OTHER PUBLICATIONS

The extended European search report issued by the European Patent Office on Sep. 19, 2023, which corresponds to European Patent Application No. 23164097.0-1012 and is related to U.S. Appl. No. 18/173,160.

* cited by examiner

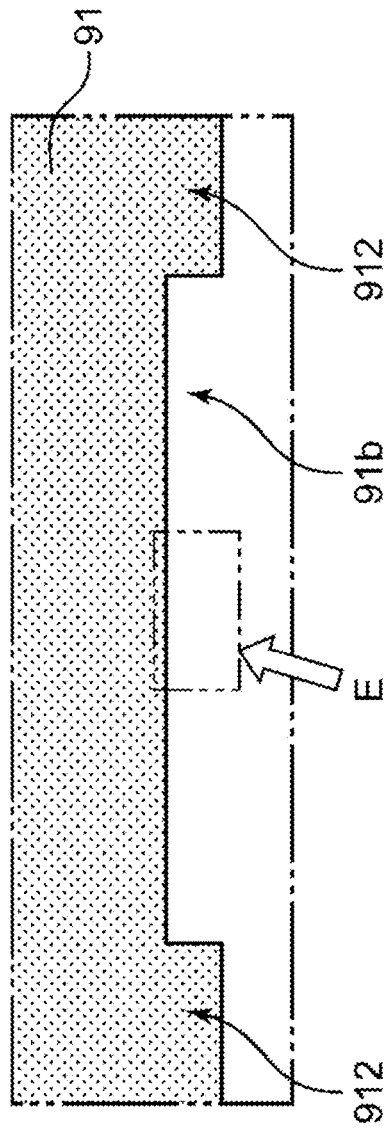
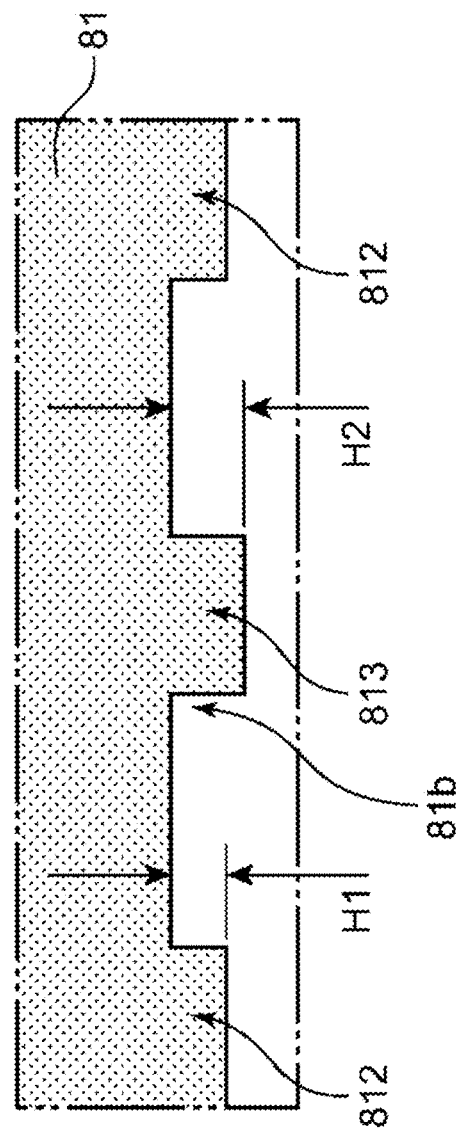
FIG. 10A
FIG. 10B

PLACEMENT STRUCTURE OF SEAT FOR VEHICLE

BACKGROUND OF THE INVENTION

The present invention relates to a placement structure of a seat for a vehicle.

Road noises are generated in a case where a floor panel is resonated by an input from a road surface in vehicle traveling. Accordingly, various technologies to reduce vibration of the floor panel have been proposed.

Japanese Utility-Model Laid-Open Publication No. H02-85635 discloses a structure in which a vibration isolation layer is interposed between a seat cushion and a floor panel in a vehicle in which the seat cushion is placed on the floor panel. The vibration isolation layer of the above-described document is configured to be relatively thick so that its lower face can contact a concave-and-convex shape of an upper face of the floor panel substantially with no gap therebetween. Further, the vibration isolation layer of the above-described document is configured to fill a whole part of gap between the seat cushion and the floor panel in order to obtain a superior vibration-sound isolation effect by enlarging its application area.

However, the structure with the vibration isolation layer of the above-described document may cause the increase of manufacturing costs and the weight of the vehicle because this vibration isolation layer is disposed entirely between the seat cushion and the floor panel.

Further, it may be considered that a relatively thick vibration insolation sheet (rubber sheet, olefin sheet or the like) is joined to the upper face of the floor panel in order to suppress resonance of the floor panel. However, even if this structure achieves the vibration reduction at a resonance frequency which has been aimed initially, this weight increase may cause a sift of the resonance frequency, so that there is a concern that the resonance may be generated at its near frequency range. That is, even if the sheet for vibration isolation is joined to the floor panel, the resonance of the floor panel cannot be suppressed sufficiently, so that the increase of the manufacturing costs and the vehicle weight may be caused.

SUMMARY OF THE INVENTION

The present invention has been devised in view of the above-described matter, and an object of the present invention is to provide a placement structure of a seat for a vehicle which can properly reduce the vibration of the floor panel, suppressing the increase of the manufacturing costs and the vehicle weight.

A placement structure of a seat for a vehicle according to a first aspect of the present invention comprises a floor panel of a vehicle, and a seat for the vehicle comprising a seat cushion which is placed on the floor panel, wherein the seat cushion comprises a body pad portion which constitutes a portion including a seat face, an outer peripheral edge portion which is provided at an outer edge portion of the seat cushion in a plan view, when viewed in a vertical direction, protrudes toward the floor panel from the body pad portion, and contacts the floor panel, and a connection portion which is provided at a portion of the seat cushion which is inwardly separated from the outer peripheral edge portion in the plan view, protrudes toward the floor panel from the body pad portion, and connects the body pad portion and the floor panel, and the body pad portion of the seat cushion has a separation portion which is provided in an area between the outer peripheral edge portion and the connection portion in the plan view, the separation portion being configured to be separated from the floor panel and face the floor panel with a gap.

According to the above-described structure, since the seat cushion comprises the connection portion protruding toward the floor panel from the body pad portion and connecting the body pad portion and the floor panel, the vibration energy of the floor panel which is generated in the vehicle traveling and the like is inputted to the body pad portion via the connection portion. This inputted vibration energy is consumed by the vibration of the body pad portion. In this case, since the body pad portion has the separation portion provided in the area between the outer peripheral edge portion and the connection portion in the plan view, the vibration of the body pad portion which may be caused by the vibration energy inputted to the body pad portion from the floor panel via the connection portion is not hindered from being generated properly.

Moreover, since the connection portion is provided to merely protrude toward the floor panel from part of a lower face of the body pad portion, the increase of the manufacturing costs and the vehicle weight which may be caused by the structure in the above-described document can be suppressed.

Accordingly, the above-described placement structure of the seat for the vehicle can properly reduce the vibration of the floor panel, suppressing the increase of the manufacturing costs and the vehicle weight.

In the above-described placement structure of the seat for the vehicle, the connection portion may have a loss coefficient of 0.01 or greater.

According to this structure, the noticeable vibration reduction effect can be obtained because of stretching vibration generated at the connection portion, compared to a case where the loss coefficient of the connection portion is smaller than 0.01.

Further, in the above-described placement structure of the seat for the vehicle, the connection portion may be located substantially at a central position, in a vehicle longitudinal direction, between a front-side side part of the outer peripheral edge portion and a rear-side part of the outer peripheral edge portion.

According to this structure, the vibration of the body pad portion caused by the vibration energy inputted via the connection portion can be suppressed from being imbalance in the longitudinal direction. Thereby, since the vibration energy is inputted to the seat cushion via the connection portion and then the energy is consumed by the vibration of the body pad portion caused by the vibration energy, the resonance of the floor panel can be properly suppressed from being generated.

Herein, the meaning of the above-described "—located substantially at a central position, in a vehicle longitudinal direction, between—" includes a case where the connection portion partially overlaps, in the plan view, with a center, in the vehicle longitudinal direction, between the front-side side part of the outer peripheral edge portion and the rear-side part of the outer peripheral edge portion.

Moreover, in the above-described placement structure of the seat for the vehicle, the connection portion may be located substantially at a central position, in a vehicle width direction, of the seat cushion.

According to this structure, the vibration of the body pad portion caused by the vibration energy inputted via the connection portion can be suppressed from being imbalance in the vehicle width direction. Thereby, since the vibration energy is inputted to the seat cushion via the connection portion and then the energy is consumed by the vibration of the body pad portion caused by the vibration energy, the resonance of the floor panel can be properly suppressed from being generated.

Herein, the meaning of the above-described "—located substantially at a central position, in a vehicle width direction, of the seat cushion" includes a case where the connection portion partially overlaps, in the plan view, with a center, in the vehicle width direction, of the seat cushion.

Further, in the above-described placement structure of the seat for the vehicle, the connection portion may be located in front of a hip point of the seat cushion in the vehicle longitudinal direction.

According to this structure, since the connection portion is located in front of the hip point of the seat cushion (a point of the seat cushion where the weight of the buttocks of a human body acts the most), a passenger seated on the seat cushion can be suppressed from feeling strange and uncomfortable due to the connection portion.

Also, in the above-described placement structure of the seat for the vehicle, the connection portion may be located substantially at a central position, in the vehicle longitudinal direction, of the seat face of the seat cushion.

According to this structure, the passenger seated on the seat cushion can be suppressed from feeling strange and uncomfortable due to the connection portion. That is, since the seat for the vehicle is configured such that the hip point is positioned in back of the central position of the seat face of the seat cushion, it can be suppressed that the seated passenger feels strange and uncomfortable due to the connection portion.

Herein, the meaning of the above-described "—located substantially at a central position, in the vehicle longitudinal direction, of the seat face of the seat cushion" includes a case where the connection portion partially overlaps, in the plan view, with a center, in the longitudinal direction, of the seat face of the seat cushion.

Moreover, in the above-described placement structure of the seat for the vehicle, the connection portion may be configured to have substantially the same Young's modulus as the body pad portion.

According to this structure, it can be suppressed that the passenger seated in the seat feels strange and uncomfortable because of providing the connection portion in the vehicle traveling.

Herein, the above-described "—substantially the same—" means that a slight difference of about 5% is allowable.

Further, in the above-described placement structure of the seat for the vehicle, the connection portion may be configured such that a length, in the vehicle longitudinal direction, thereof is set to be ⅓ of a distance between a front-side part of the outer peripheral edge portion and a rear-side part of the outer peripheral edge portion or smaller.

According to this structure, the increase of the manufacturing costs and the vehicle weight can be suppressed more effectively, compared to a case where the connection portion which is rather long in the longitudinal direction (longer than ⅓ of the distance between the front-side part of the outer peripheral edge portion and the rear-side part of the outer peripheral edge portion) is used like the structure disclosed in the above-described document.

Meanwhile, a placement structure of a seat for a vehicle according to a second aspect of the present invention comprises a floor panel of a vehicle, and a seat for the vehicle comprising a seat cushion which is placed on the floor panel, wherein the seat cushion comprises a body pad portion which constitutes a portion including a seat face and is configured such that a lower face thereof is separated from the floor panel and faces the floor panel with a gap and an outer peripheral edge portion which is provided at an outer edge portion of the seat cushion in a plan view, when viewed in a vertical direction, protrudes toward the floor panel from the body pad portion, and contacts the floor panel, and the placement structure of the seat for the vehicle further comprises a connecting member which is provided between the lower face of the body pad portion and an upper face of the floor panel at a portion which is separated from the outer peripheral edge portion of the seat cushion in the plan view so as to connect the body pad portion and the floor panel.

According to the above-described structure, since the connecting member which connects the body pad portion and the floor panel is provided, the vibration energy of the floor panel which is generated in the vehicle traveling and the like is inputted to the body pad portion via the connecting member. The inputted vibration energy is consumed by the vibration of the body pad portion. Herein, since the lower face of the body pad portion is separated from the floor panel and faces the floor panel with the gap in an area which excludes a portion where the outer peripheral edge portion is provided and another portion which is connected to the floor panel via the connecting member, the vibration of the body pad portion which is caused by the vibration energy inputted to the body pad portion from the floor panel via the connecting member is not hindered.

Moreover, since part of the body pad portion of the seat cushion and part of the floor panel are merely interconnected by the connecting member, the increase of the manufacturing costs and the vehicle weight which may be caused by the structure in the above-described document can be suppressed.

Accordingly, the above-described placement structure of the seat for the vehicle can properly reduce the vibration of the floor panel, suppressing the increase of the manufacturing costs and the vehicle weight.

In the above-described placement structure of the seat for the vehicle, the connecting member may be configured to have a smaller Young's modulus than the body pad portion.

According to this structure, it can be suppressed that the passenger seated in the seat feels strange and uncomfortable because of providing the connecting member in the vehicle traveling.

Also, in the above-described placement structure of the seat for the vehicle, the connecting member may be configured such that a length, in the vehicle longitudinal direction, thereof is set to be ⅓ of a distance between a front-side part of the outer peripheral edge portion and a rear-side part of the outer peripheral edge portion or smaller.

According to this structure, the increase of the manufacturing costs and the vehicle weight can be suppressed more effectively, compared to a case where the connecting member which is rather long in the longitudinal direction (longer than ⅓ of the distance between the front-side part of the outer peripheral edge portion and the rear-side part of the outer peripheral edge portion) is used like the structure disclosed in the above-described document.

Additionally, in the above-described placement structure of the seat for the vehicle, the seat cushion may be configured such that part of a resonance frequency of the seat cushion substantially matches part of a resonance frequency of the floor panel.

According to this structure, the vibration energy inputted to the body pad portion of the seat cushion from the floor panel can be effectively at the body pad portion.

Herein, the meaning of the above-described "—substantially matches—" includes not only a case where part of the resonance frequency of the seat cushion matches part of the resonance frequency of the floor panel, but also a case where a frequency area corresponding to a certain range around a peak of the resonance frequency of the seat cushion matches part of the resonance frequency of the floor panel. For example, when the resonance frequency of the seat cushion (peak value) is represented by Fr and the above-described frequency area corresponding to the certain range around the peak is represented by α, a range from (Fr−α) to (Fr+α) can be covered (included) by the above-described word specification of "substantially matches." Herein, "α" can be specified as (Fr×√2), for example.

Thus, any of the above-described placement structures of the seat for the vehicle can obtain the superior vibration reduction effect of the floor panel, suppressing the increase of the manufacturing costs and the vehicle weight.

The present invention will become apparent from the following description which refers to the accompanying drawings.

BRIEF DESCRIPTION OF THE DRAWINGS

FIG. 10A is a sectional view showing a partial structure of a seat cushion according to a comparative example 11, FIG. 10B is a sectional view showing a partial structure of a seat cushion according to examples 11, 12.

DETAILED DESCRIPTION OF THE INVENTION

Figure 1:
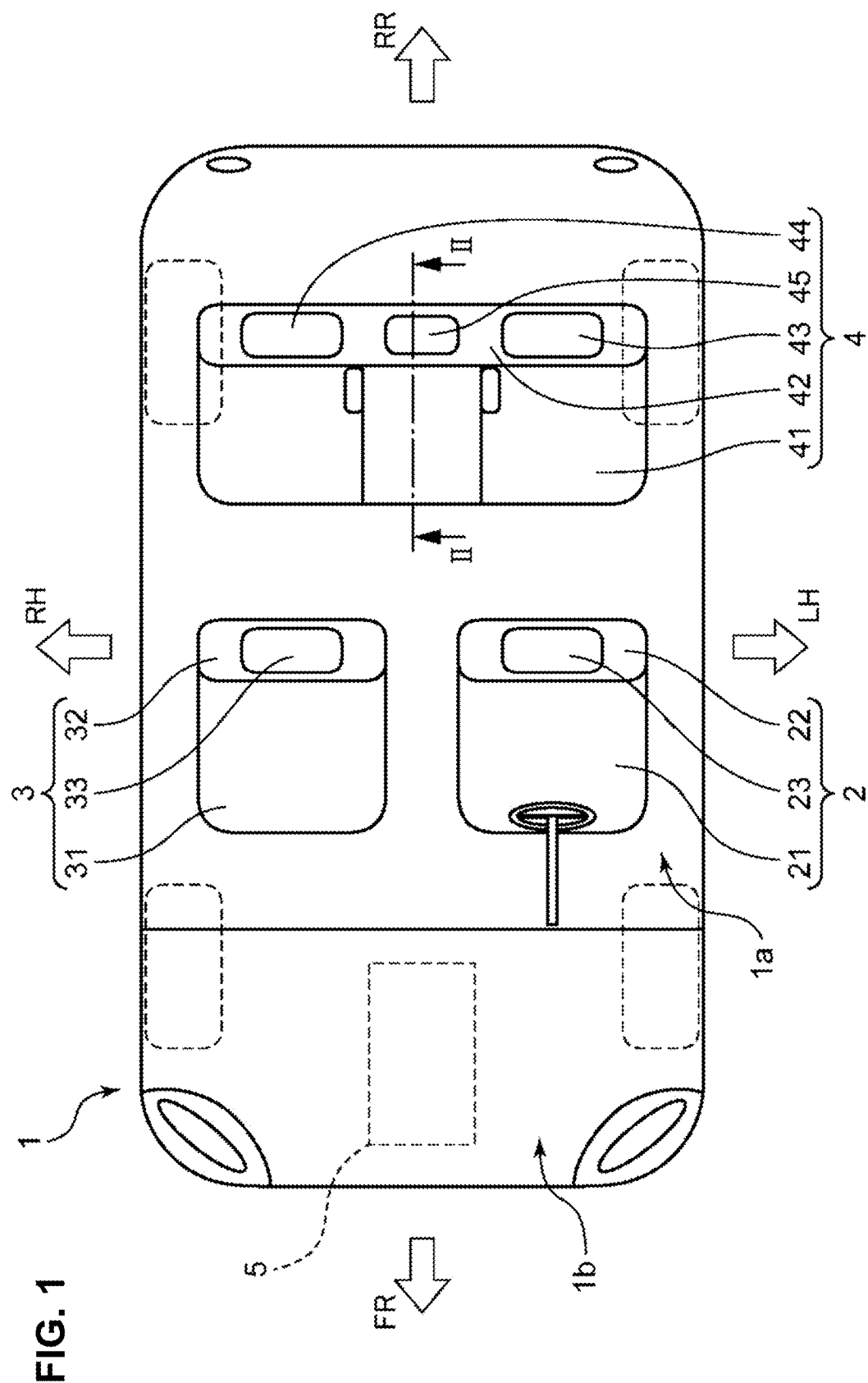
FIG. 1 is a schematic diagram showing a structure of a vehicle which is provided with a rear seat according to an embodiment.

Hereafter, an embodiment of the present invention will be described referring to the drawings. Herein, the following embodiment is merely one example of the present invention, and the present invention is not to be limited to this example except its substantial structure.

Embodiment

1. Structure of Vehicle 1

A vehicle 1 which is provided with a rear seat 4 according to the embodiment of the present invention will be described referring to FIG. 1.

As shown in FIG. 1, the vehicle 1 has a cabin 1a where passengers stay and a vehicle front chamber 1b where a vehicle-traveling drive source 5 comprising an engine and an electric motor is installed, which is positioned in front of the cabin 1a. The cabin 1a is partitioned from the vehicle front chamber 1b by a dash panel.

A pair of front seats 2, 3 and a rear seat 4 are arranged in the cabin 1a of the vehicle 1. The front seat 2 comprises a seat cushion 21, a seatback 22, and a headrest 23. The front seat 3 comprises a seat cushion 31, a seatback 31, and a headrest 33. The rear seat 4, a seat where three passengers can be seated, comprises a seat cushion 41, a seatback 42, and headrests 43-45. Herein, the rear seat of the present embodiment corresponds to "a seat for a vehicle" of the present invention.

2. Placement Structure of Rear Seat 4 on Floor Panel 6

Figure 2:
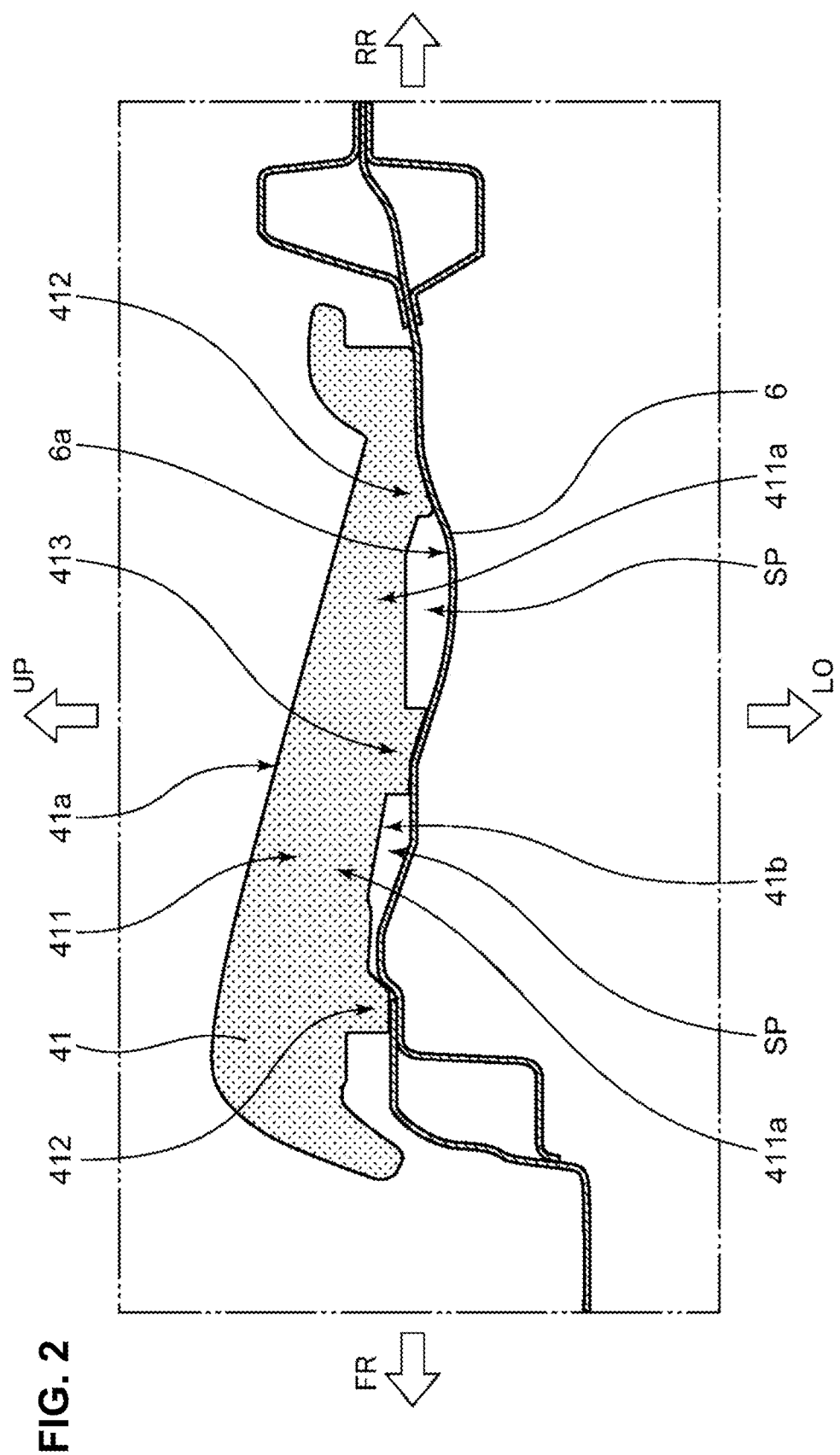
FIG. 2 is a sectional view taken along line II-II of FIG. 1.

The seat cushion 41 of the rear seat 4 is directly placed on the floor panel 6 in the vehicle 1. The structure of the seat cushion 41 of the rear seat 4 will be described referring to FIG. 2. FIG. 2 is a sectional view taken along line II-II of FIG. 1.

As shown in FIG. 2, the seat cushion 41 of the rear seat 4 is formed integrally by a body pad portion 411, an outer peripheral edge portion 412, and a connection portion 413. The body pad portion 411 of the seat cushion 41 is made of a urethane foaming material, and its Young's modulus and loss coefficient are indicated in the flowing chart 1.

CHART 1

| | | Young's modulus MPa | Loss coefficient |
|---|---|---|---|
| Seat cushion | Urethane foaming material | 0.3 | 0.2 |

Herein, since the body pad portion 411, the outer peripheral edge portion 412, and the connection portion 413 are formed integrally in the present embodiment, the loss coefficient and the Young's modulus of the connection portion 413 are the same as those indicated in the chart 1.

The body pad portion 411 is configured to expand in a longitudinal direction and in a vehicle width direction (direction orthogonal to a sheet of FIG. 2) of the vehicle 1. Part of an upper face of the body pad portion 411 constitutes a seat face 41a of the seat cushion 41.

The outer peripheral edge portion 412 is configured to protrude downwardly (toward the floor panel 6) from the vicinity of an outer peripheral edge of the body pad portion 411 in a case where the seat cushion 41 is viewed in a plan view from one side of a vertical direction. A lower face of the outer peripheral edge portion 412 contacts an upper face 6a of the floor panel 6 in a state where the seat cushion 41 is placed on the floor panel 6.

The connection portion 413 is configured to protrude downwardly (toward the floor panel 6) from the body pad portion 411 at a position separated from both of a front-side part of the outer peripheral edge portion 412 and a rear-side part of the outer peripheral edge portion 412 in a case where the seat cushion 41 is viewed in the plan view from one side of the vertical direction. In the state where the seat cushion 41 is placed on the floor panel 6, a lower face of the connection portion 413 contacts an upper face of the floor panel 6, thereby connecting the floor panel 6 and the body pad portion 411.

Herein, as shown in the sectional view of FIG. 2, a lower face 41b of the seat cushion 41 faces the upper face 6a of the floor panel 6 with a gap SP at a portion, in the longitudinal direction of the vehicle 1, between the front-side part of the outer peripheral edge portion 412 and connection portion 413 and another portion, in the longitudinal direction of the vehicle 1, between the rear-side outer peripheral edge portion 412 and the connection portion 413. These portions of the body pad portion 411 where the lower face 41b faces the upper face 6a of the floor panel 6 with the gap SP are separation portions 411a.

3. Arrangement Position of Connection Portion 413 of Seat Cushion 41

An arrangement position of the connection portion 413 of the seat cushion 41 will be described referring to FIGS. 3 through 5. Herein, FIG. 4 is a lower face of the seat cushion 41, when viewed from a side of lower face 41b.

Figure 3:
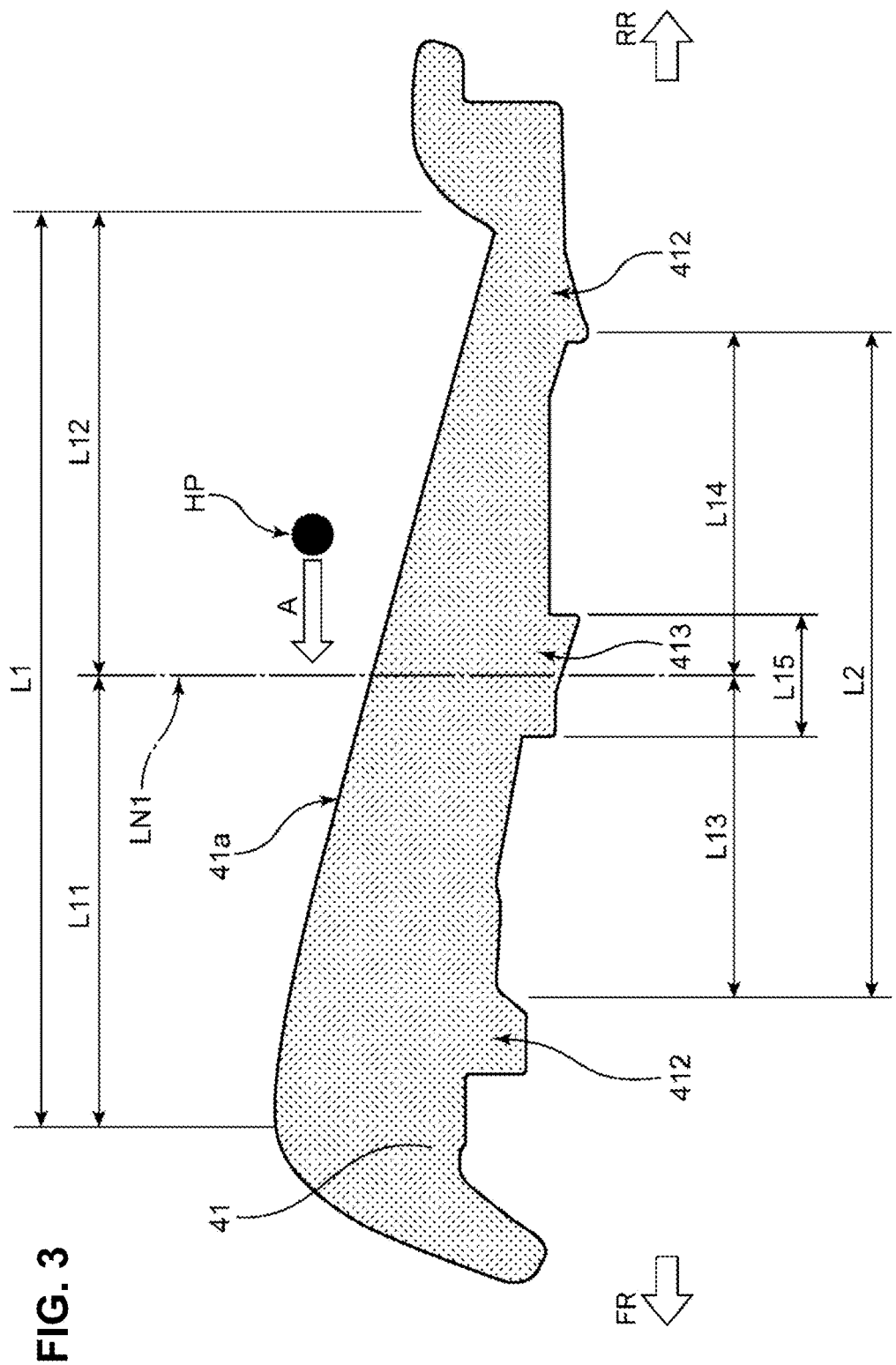
FIG. 3 is a sectional view showing a structure of a seat cushion.
Figure 4:
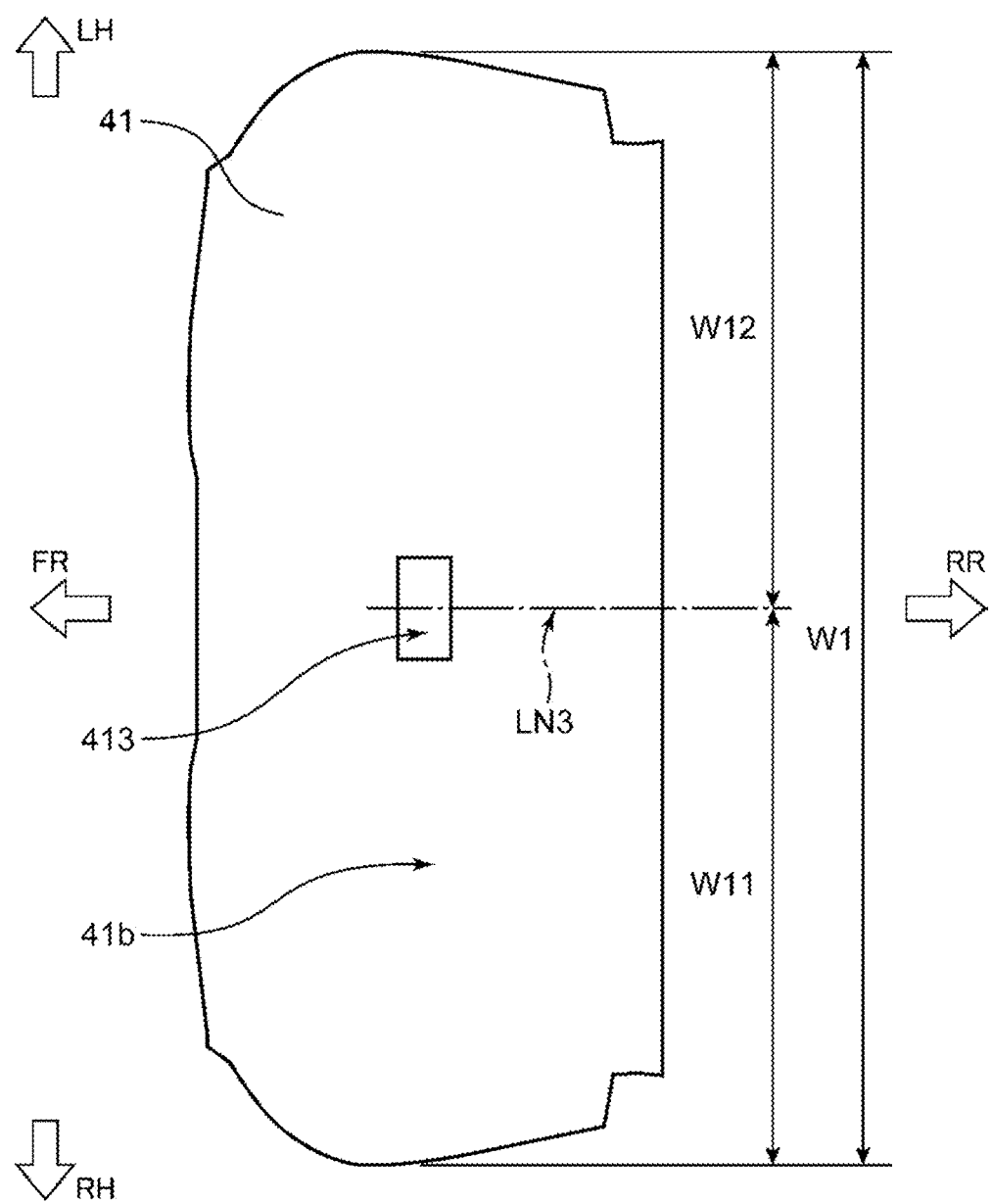
FIG. 4 is a lower view showing an arrangement position of a connection portion of the seat cushion.

As shown in FIG. 3, the seat cushion 41 has the seat face 41a at part of its upper face. The seat face 41a is provided in an area extending from an upward protrusion portion at a front part of the seat cushion 41 to a downward recess portion at a rear part of the seat cushion 41. A length, in the longitudinal direction of the vehicle 1, of the seat face 41a is L1.

An imaginary line (seat-face center line) LN1 which passes through a central portion of the connection portion 413 is located substantially at a central position, in the longitudinal direction of the vehicle 1, of the seat face 41a. That is, a distance L11 between the imaginary line LN1 passing through the central portion of the connection portion 413 and a front end portion of the seat face 41a and a distance L12 between the imaginary line LN1 and a rear end portion of the seat face 41a are substantially equal in the longitudinal direction of the vehicle 1. Herein, a state where the connection portion 413 is provided to overlap with the central position, in the longitudinal direction, of the seat face 41a of the seat cushion 41 in the plan view is covered by the above-described description of "—located substantially at a central position—."

Further, as shown in FIG. 3, according to the seat cushion 41 of the rear seat 4 of the present embodiment, the imaginary line LN1 is positioned in front of a hip point HP in the longitudinal direction of the vehicle 1 (an arrow A). Further, a rear end of the connection portion 413 is positioned in front of the hip point HP.

Figure 5:
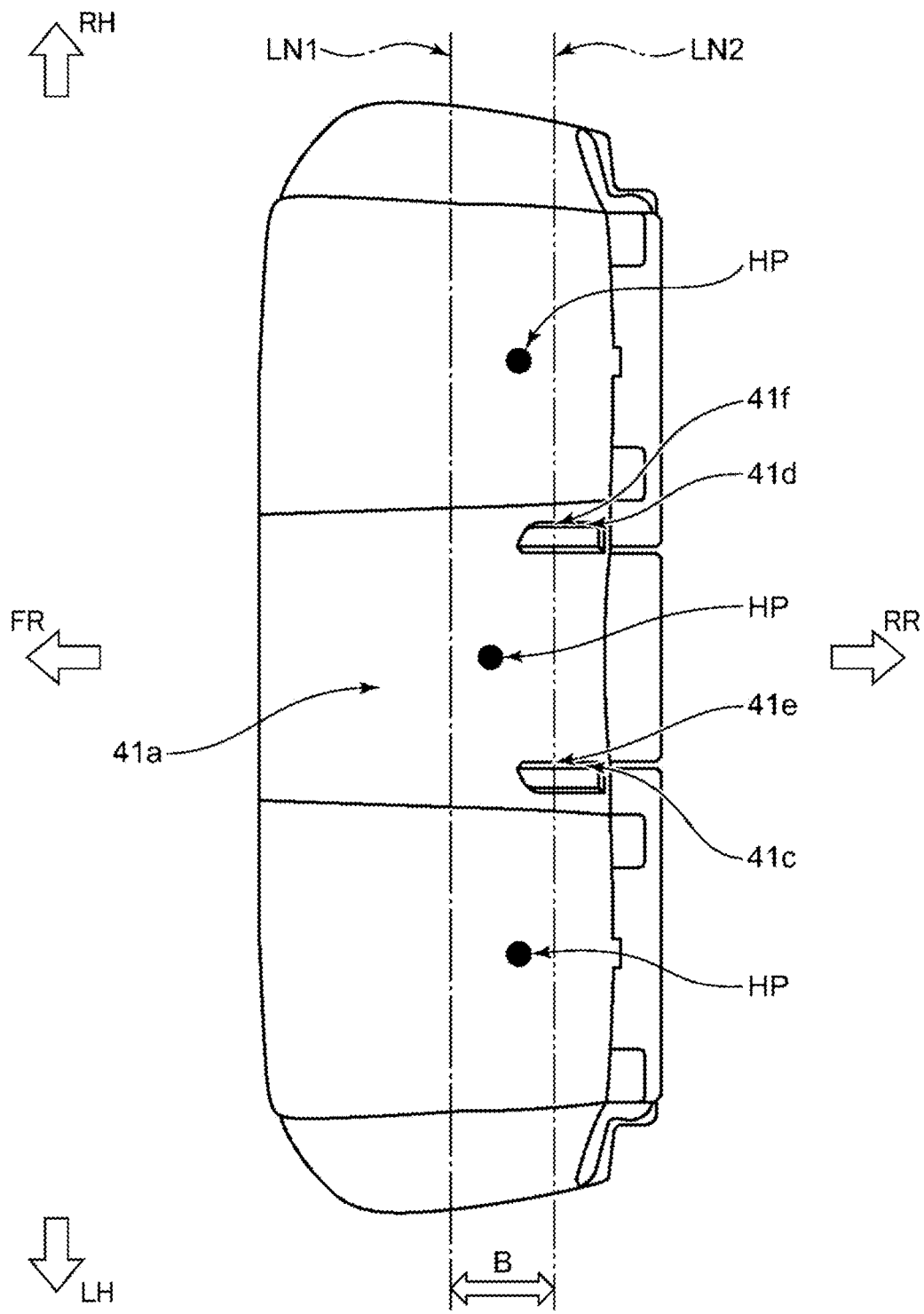
FIG. 5 is an upper view showing a position of a hip point of the seat cushion.

The position of the hip point HP of the seat cushion 41 will be specifically described referring to FIG. 5.

As shown in FIG. 5, two buckle storage portions (recess portions) 41c, 41d are provided at the rear end portion of the seat face 41a of the seat cushion 41 of the rear seat 4. The buckle storage portions 41c, 41d are places where seatbelt's buckles are stored when seatbelts are not used. Belt insertion holes 41e, 41f are opened at the buckle storage portions 41c, 41d. The belt insertion holes 41e, 41f are holes where the seatbelts with the buckles are inserted.

An imaginary line LN2 which passes through the belt insertion holes 41e, 41f provided at the two buckle storage portions 41c, 41d and extends in the vehicle width direction is formed. In this case, the hip point HP is positioned in an area (an arrow B) between the imaginary line LN1 passing through the center, in the longitudinal direction, of the seat face 41a and the imaginary line LN2.

Returning to FIG. 3, in the seat cushion 41 of the rear seat 4 of the present embodiment, a whole part of the connection portion 413 is positioned in front of the hip point HP.

As shown in FIG. 3, the imaginary line LN1 passing through the central portion of the connection portion 413 is located substantially at a central position, in the longitudinal direction of the vehicle 1, between a rear end portion of the front-side part of the outer peripheral edge portion 412 and a front end portion of the rear-side part of the outer peripheral edge portion 412. That is, in the longitudinal direction of the vehicle 1, a distance L13 between the imaginary line LN1 and the rear end portion of the front-side part of the outer peripheral edge portion 412 is substantially equal to a distance L14 between the imaginary line LN1 and the front end portion of the rear-side part of the outer peripheral edge portion 412. In other words, the distance L13 and the distance L14 are respectively set to be mostly ½ of a distance L2, in the longitudinal direction, between the rear end portion of the front-side part of the outer peripheral edge portion 412 and the front end portion of the rear-side part of the outer peripheral edge portion 412. Herein, a state where the connection portion 413 is provided to overlap with the central position between the rear end portion of the front-side part of the outer peripheral edge portion 412 and the front end portion of the rear-side part of the outer peripheral edge portion 412 in the plan view is covered by the above-described description of "—located substantially at a central position—."

Further, in the rear seat 4 of the present embodiment, a length L15, in the longitudinal direction of the vehicle 1, of the connection portion 413 is set to be ⅓ of the distance L2 between the rear end portion of the front-side part of the outer peripheral edge portion 412 and the front end portion of the rear-side part of the outer peripheral edge portion 412 or smaller.

Next, as shown in FIG. 4, an imaginary line LN3 which extends in the longitudinal direction of the vehicle 1 from a central portion, in the vehicle width direction, of the connection portion 413 is formed. In this case, the imaginary line LN3 is located substantially at a central position, in the vehicle width direction, of the seat cushion 41. That is, in the width direction of the vehicle 1, a distance W11 between the imaginary line LN3 and a right end of the seat cushion 41 is substantially equal to a distance W12 between the imaginary line LN3 and a left end of the seat cushion 41. In other words, the distance W11 and the distance W12 are respectively set to be mostly ½ of a width W1 of the seat cushion 41. Herein, a state where the connection portion 413 is provided to overlap with the central position, in the width direction, of the seat cushion 41 in the plan view is covered by the above-described description of "—located substantially at a central position—."

4. Placement Portion of Rear Seat 4 at Floor Panel 6

A placement portion of the rear seat 4 at the floor panel 6 will be described referring to FIG. 6.

Figure 6:
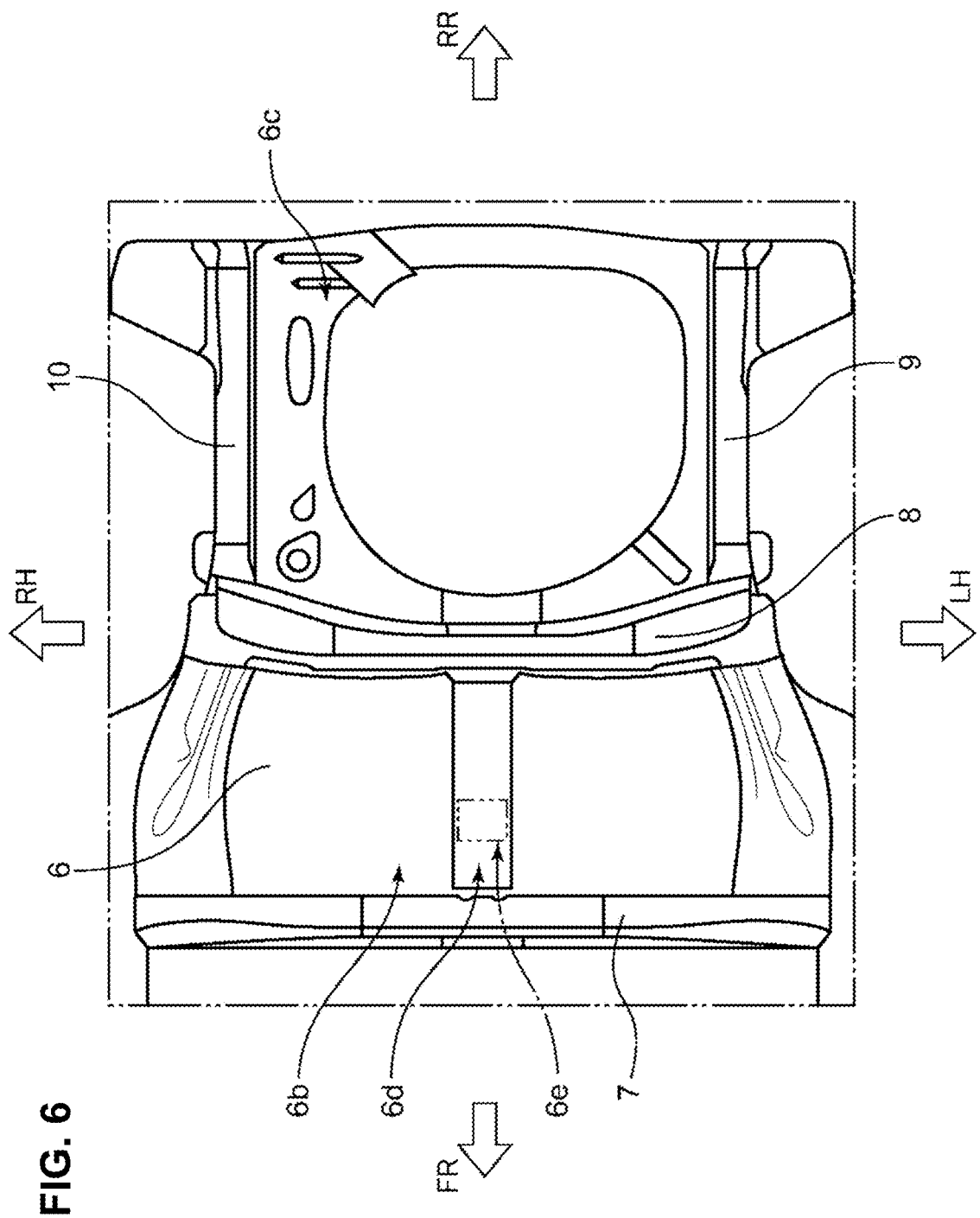
FIG. 6 is an upper view showing part of a floor panel.

As shown in FIG. 6, a rear portion of the vehicle 1 comprises rear side frames 9, 10 which are respectively provided to extend in the longitudinal direction at the right and the left and cross members (No. 3 cross member, No 4 cross member) 7, 8 which are provided to be separated from each other in the longitudinal direction and respectively extend in the vehicle width direction. Each of the cross members 7, 8 has a closed-cross section structure.

The floor panel 6 at the rear portion of the vehicle 1 comprises a rear seat pan portion 6b which is arranged between the cross member 7 and the cross member 8 and a rear floor pan portion 6c which is arranged in back of the cross member 8. The seat cushion 41 of the rear seat 4 is placed on the rear seat pan portion 6b of the floor panel 6.

The rear seat pan portion 6b is provided with a convex portion 6e which protrudes upwardly from a central position, in the vehicle width direction, thereof and extends from an arrangement portion of the cross member 7 to a portion where the cross member 8 is provided.

In a state where the seat cushion 41 of the rear seat 4 is placed on the rear seat cushion 6b, the connection portion 413 of the seat cushion 41 contacts the connected portion 6e which is illustrated by an enclosing two-dotted line. Herein, the lower face 41b contacts both-side portions of the rear seat pan portion 6b except a top of the convex portion 6d.

5. Vibration Suppression Mechanism of Floor Panel 6

According to the present embodiment, the vibration of the floor panel 6 can be suppressed by placing the above-described seat cushion 41 on the floor panel 6. This mechanism will be described referring to FIG. 7.

Figure 7:
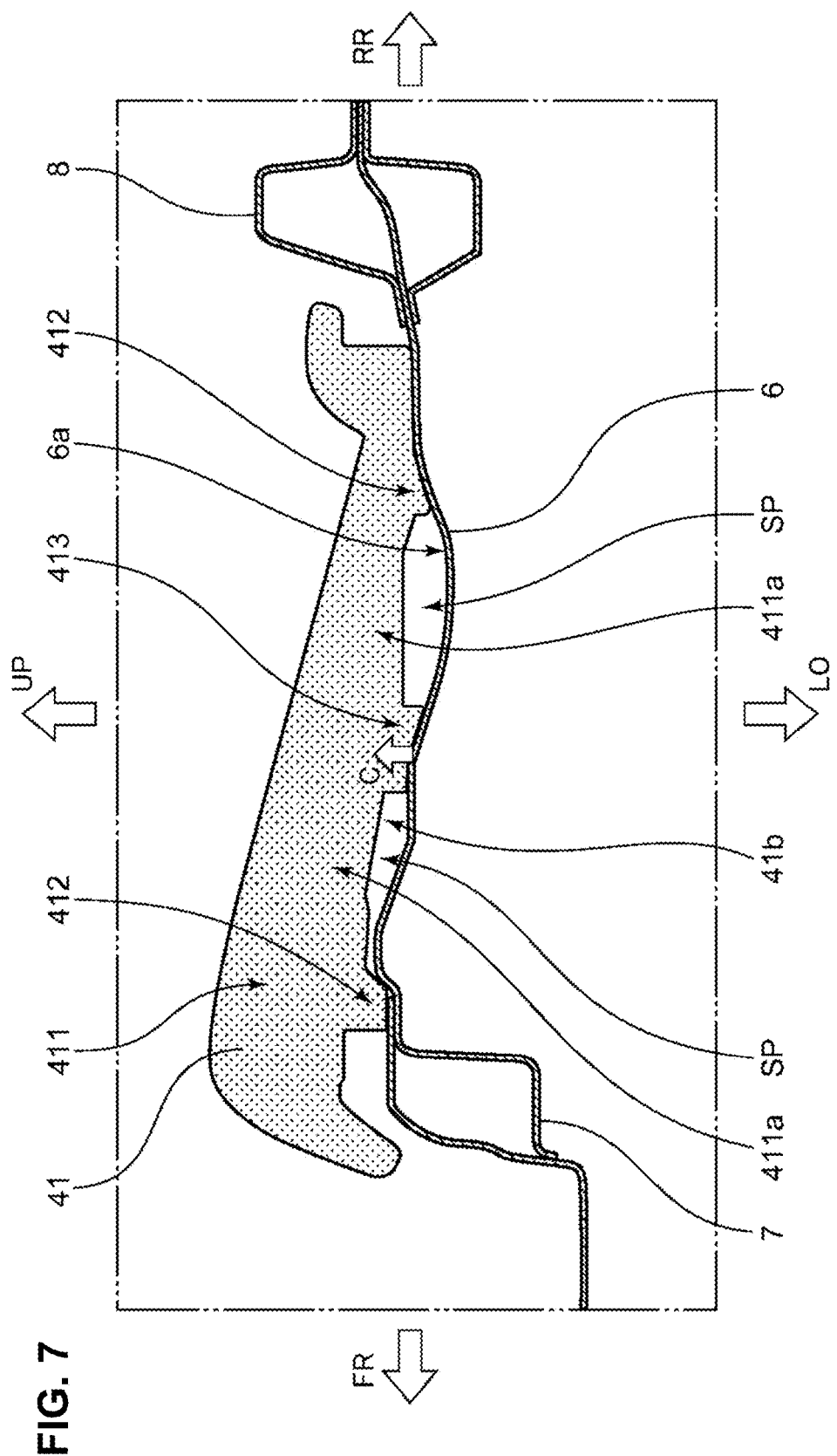
FIG. 7 is a sectional view showing a transmission manner of vibration energy transmitted from the floor panel to a body pad portion.

In the present embodiment, as shown in FIG. 7, in a case where the seat cushion 41 of the rear seat 4 is placed on the upper face 6a of the floor panel 6, the outer peripheral edge portion 412 and the connection portion 413 contact the upper face of the floor panel 6. When the floor panel 6 vibrates in the traveling of the vehicle 1, the vibration energy is transmitted to the body pad portion 411 of the seat cushion 41 via the connection portion 413 (an arrow C). Then, the body pad portion 411 of the seat cushion 41 is made to vibrate by the transmitted vibration energy, thereby consuming the vibration energy. That is, according to the present embodiment, the seat cushion 41 of the rear seat 4 is utilized as a multi-resonance reduction structure, whereby the vibration of the floor panel 6 can be reduced.

Moreover, since the body pad portion 411 of the seat cushion 41 has the separation portions 411a which is provided between the outer peripheral edge portion 412 and the connection portion 413 in the longitudinal direction of the vehicle 1 such that its lower face 41b faces the upper face 6a of the floor panel 6 with the gap SP, it can be suppressed that the vibration of the body pad portion 411 which is caused by the vibration energy transmitted from the connection portion 413 is hindered.

According to the present embodiment, the vibration of the floor panel 6 can be suppressed by the above-described mechanism, so that generation of vibrations and noises at the vehicle 1 can be reduced properly.

6. Effect

In the placement structure of the rear seat 4 according to the present embodiment, since the connection portion 413 which protrudes toward the floor panel 6 from the body pad portion 411 and connects the body pad portion 411 and the floor panel 6 is provided, the vibration energy of the floor panel 6 which is generated in the vehicle traveling and the like is inputted to the body pad portion 411 via the connection portion 413. This inputted vibration energy is consumed by the vibration of the body pad portion 411. In this case, since the body pad portion 411 has the separation portion 411a provided in the area between the outer peripheral edge portion 412 and the connection portion 413 in the plan view, the vibration of the body pad portion 411 which may be caused by the vibration energy inputted to the body pad portion 411 from the floor panel 6 via the connection portion 413 is not hindered from being generated properly.

Moreover, since the connection portion 413 is merely provided to protrude toward the floor panel 6 from part of the lower face 41b of the body pad portion 411, the increase of the manufacturing costs and the vehicle weight which may be caused by the structure in the above-described document can be suppressed.

Accordingly, the above-described placement structure of the rear seat 4 can properly reduce the vibration of the floor panel 6, suppressing the increase of the manufacturing costs and the vehicle weight.

In the above-described placement structure of the rear seat 4 according to the present embodiment, since the connection portion 413 has the loss coefficient of 0.2 (0.01 or greater), the noticeable vibration reduction effect can be obtained because of stretching vibration generated at the connection portion 413, compared to a case where the loss coefficient of the connection portion is smaller than 0.01.

Further, in the placement structure of the rear seat 4 according to the present embodiment, since the connection portion 413 is located substantially at the central position, in the longitudinal direction of the vehicle 1, between the front-side side part of the outer peripheral edge portion 412 and the rear-side part of the outer peripheral edge portion 412, the vibration of the body pad portion 411 caused by the vibration energy inputted via the connection portion 413 can be suppressed from being imbalance in the longitudinal direction. Thereby, since the vibration energy is inputted to the seat cushion 41 via the connection portion 413 and then the energy is consumed by the vibration of the body pad portion 411 caused by the vibration energy, the resonance of the floor panel 6 can be properly suppressed from being generated.

Moreover, in the placement structure of the rear seat 4 according to the present embodiment, the connection portion 413 is located substantially at the central position, in the vehicle width direction, of the seat cushion 41, the vibration of the body pad portion 411 caused by the vibration energy inputted via the connection portion 413 can be suppressed from being imbalance in the vehicle width direction. Thereby, since the vibration energy is inputted to the seat cushion 41 via the connection portion 413 and then the energy is consumed by the vibration of the body pad portion 411 caused by the vibration energy, the resonance of the floor panel 6 can be properly suppressed from being generated.

Further, in the placement structure of the rear seat 4 according to the present embodiment, since the connection portion 413 is located in front of the hip point (a point of the seat cushion where the weight of the buttocks of a human body acts the most) HP of the seat cushion 41, the passenger seated on the seat cushion 41 can be suppressed from feeling strange and uncomfortable due to the connection portion 413.

Also, in the placement structure of the rear seat 4 according to the present embodiment, the connection portion 413 is located substantially at the central position, in the longitudinal direction, of the seat face 41a of the seat cushion 41, the passenger seated on the seat cushion 41 can be suppressed from feeling strange and uncomfortable due to the connection portion 413. That is, since the rear seat 4 is configured such that the hip point HP is positioned in back of the central position of the seat face 41a of the seat cushion 41, it can be suppressed that the seated passenger feels strange and uncomfortable due to the connection portion 413.

Moreover, in the placement structure of the rear seat 4 according to the present embodiment, since the Young's modulus of the connection portion 413 is 0.3 which is the same as the body pad portion 411, it can be suppressed that the passenger seated in the rear seat 4 feels strange and uncomfortable because of providing of the connection portion 413 in the traveling of the vehicle 1.

Further, in the placement structure of the rear seat 4 according to the present embodiment, the length L15, in the longitudinal direction, of the connection portion 413 is set to be ⅓ of the distance L2 between the front-side part of the outer peripheral edge portion 412 and the rear-side part of the outer peripheral edge portion 412 or smaller, the increase of the manufacturing costs and the vehicle weight can be suppressed more effectively, compared to a case where the connection portion 413 which is long in the longitudinal direction (longer than ⅓ of the distance between the front-side part of the outer peripheral edge portion and the rear-side part of the outer peripheral edge portion) is used like the structure disclosed in the above-described document.

As described above, the placement structure of the rear seat 4 according to the present embodiment can properly reduce the vibration of the floor panel 6, suppressing the increase of the manufacturing costs and the vehicle weight.

[Effect Confirmation]

An experiment to confirm the vibration reduction effect of the floor panel 6 in the placement structure of the rear seat 4 according to the present embodiment was conducted. The results will be described referring to FIGS. 8 and 9.

(1) Confirmation of Vibration Reduction Effect of Floor Panel 6

An example 1 and comparative examples 1, 2 were prepared for confirmation of the vibration reduction effect of the floor panel 6.

Example 1

The example 1 had a structure in which the rear seat 4 provided with the seat cushion 41 having the same structure as the above-described embodiment was placed on the floor panel 6. Herein, in the example 1, the connection portion 413 having a length, in the longitudinal direction, thereof of 60 mm, a width, in the vehicle width direction, thereof of 120 mm, and a height, in the vertical direction, thereof of 30 mm before in a state of placing the seat cushion 41 on the floor panel 6 (i.e., a natural-state height) was adopted. Herein, the connection portion 413 was configured to be compressed up to the height of 20 mm in a state where the seat cushion 41 was placed on the floor panel 6.

Comparative Example 1

In the comparative example 1, a seat cushion which did not have connection portion 413 was adopted, and any other structures were the same as the above-described example 1.

Comparative Example 2

In the comparative example 2, an olefin sheet of about 200 g was joined to the connected portion 6e of the floor panel 6, and any other structures were the same as the above-described comparative example 1.

By using respective analysis models of the above-described example 1, comparative example 1, and comparative example 2, the equivalent radiated power (ERP) for each frequency when the floor panel 6 was excited was evaluated as an index (parameter). The results are shown in FIG. 8.

Figure 8:
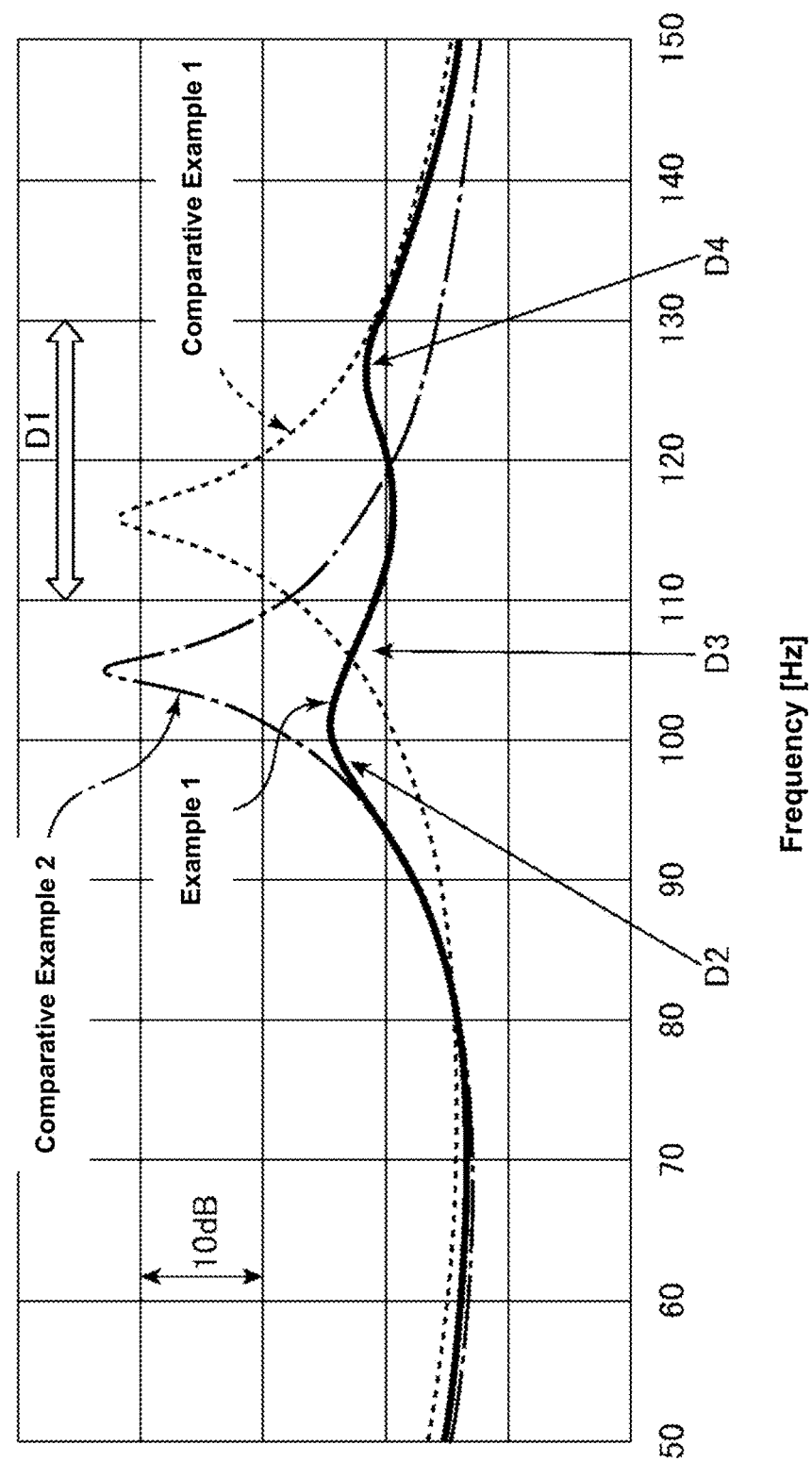
FIG. 8 is a graph showing ERP (Equivalent Radiated Power) of the floor panel.

As shown in FIG. 8, the analysis model of the comparative example 1 showed a peak around 116 Hz. Herein, it is important to reduce the ERP in a frequency range of 110-130 Hz (shown by an arrow D1) for reduction of the vibrations and noises of the vehicle 1. In this regard, it is considered that the analysis model of the comparative example 1 may produce a problem of the vibrations and noises of the vehicle 1 due to the vibration of the floor panel 6.

The analysis model of the comparative example 2 showed a peak around 105 Hz, although the ERP in the range D1 is lower than that of the comparative example 1. That is, according to the analysis model of the comparative example 2, the peak frequency of the ERP was merely shifted toward a lower frequency side and the vibration of the floor panel 6 was not able to be reduced.

Meanwhile, according to the analysis model of the example 1, the ERP was reduced by 10-20 dB in the range of 95-130 Hz including the range D1, compared to the analysis models of the comparative examples 1, 2. Herein, in FIG. 8, an arrow D2 shows a mode of a primary resonance, an arrow D3 shows a mode of a secondary resonance, and an arrow D4 shows a mode of a tertiary resonance, and it can be apparent from this FIG. 8 that the ERP of the analysis model of the example 1 was reduced, compared to the comparative examples 1, 2.

(2) Confirmation of Noise Reduction Effect

Next, a sound pressure at a position of a left-side ear of a passenger who is seated in the left-side front seat 2 was measured by using the analysis models of the example 1 and the comparative examples 1, 2. The results are shown in FIG. 9.

Figure 9:
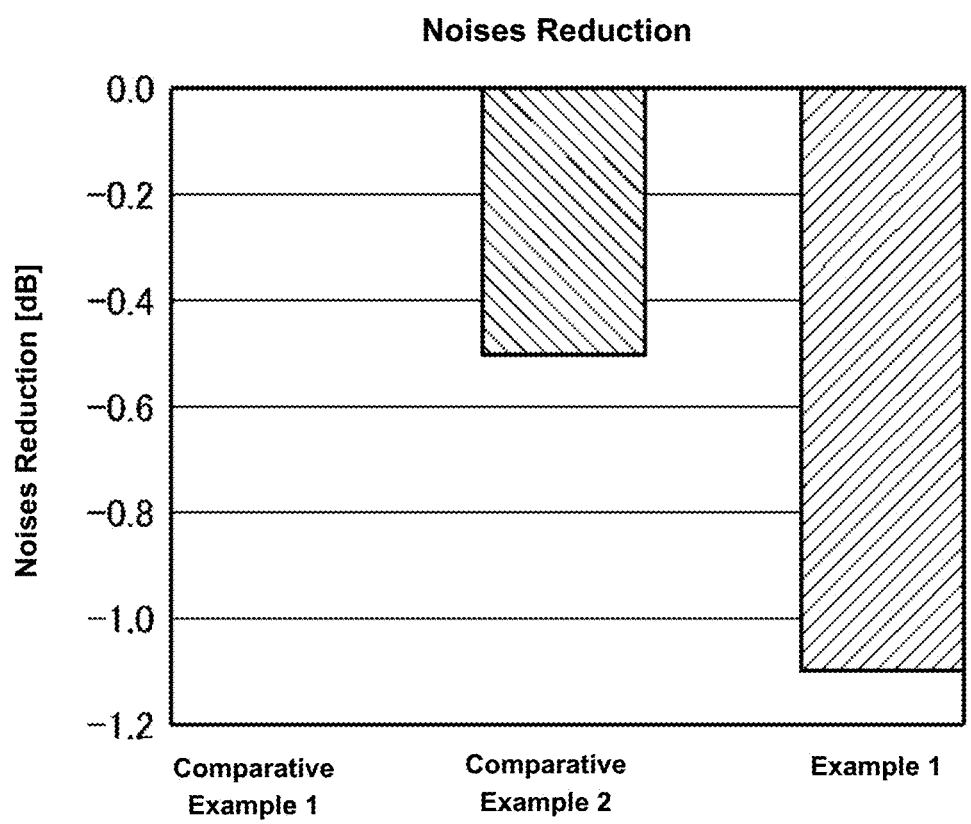
FIG. 9 is a graph showing the vibration reduction effect of the floor panel.

As shown in FIG. 9, when the analysis model of the comparative example 1 was standardized, the sound pressure (noise) of the analysis model of the comparative example 2 was reduced by 0.5 dB, whereas the sound pressure (noise) of the analysis model of the example 1 was reduced by 1.1 dB. That is, according to the analysis model of the example 1, the sound pressure for the passenger seated in the left-side front seat 2 could be reduced to a properly lower level, compared to the comparative examples 1, 2.

[Study on Size of Connection Portion 413]

A relationship between a size of the connection portion 413 provided below the body pad portion 411 and a fact that the passenger seated on the seat cushion 41 of the rear seat 4 feels strange and uncomfortable was studied. The study results will be described referring to FIGS. 10 and 11.

Respective samples of a comparative example 11 and examples 11, 12 which are configured as described below were used for the study as to whether or not the seated passenger feels strange and uncomfortable.

Comparative Example 11

As shown in FIG. 10A, a seat cushion 91 of the comparative example 11 had an outer peripheral edge portion 912 which protruded downwardly from a lower face 91b. Herein, as shown by an arrow E of FIG. 10A, the seat cushion 91 did not have any connection portion which was provided between a front-side part and a rear-side part of the ouster peripheral edge portion 912.

Example 11

As shown in FIG. 10B, a seat cushion 81 of the example 11 had an outer peripheral edge portion 812 and a connection portion 813 which protruded downwardly from a lower face 81b. In the example 11, a height H1 of the outer peripheral edge portion 812 relative to the lower face 81b (an area where the outer peripheral edge portion 812 and the connection portion 813 are not provided) of the seat cushion 81 was set to be 20 mm, and a height H2 of the connection portion 813 relative to the lower face 81b was set to be 30 mm.

Example 12

A seat cushion of the example 12 was configured such that a height of a connection portion was set to be 20 mm and any other structure was the same as the seat cushion 81 of the example 11.

Respective pressure ratios regarding buttocks of a seated passenger were measured by using samples of the examples 11, 12 and the comparative example 11. The results are shown in FIG. 11.

Figure 11:
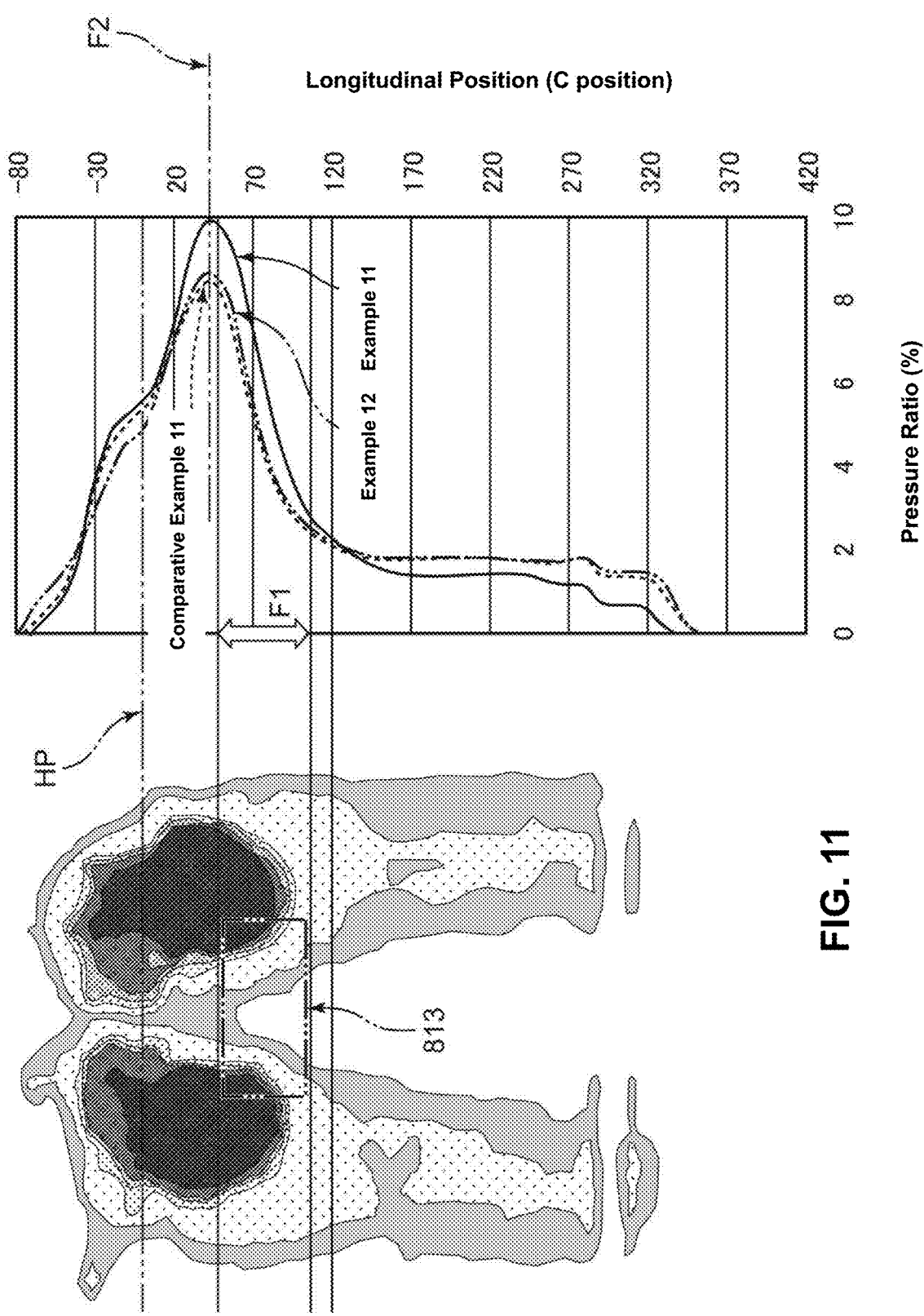
FIG. 11 is a graph showing a pressure distribution at a seat face of the seat cushion.

As shown in FIG. 11, measuring of the pressure ratio was conducted based on the hip point HP. The connection portion 813 was positioned at a point in front of the hip point HP (an arrow F1) in the seat cushion 81 of the example 11. Herein, the connection portion was located at the same position in the seat cushion of the example 12 as well.

As shown by a graph on the right in FIG. 11, the pressure at a position which is 40-50 mm forward from the hip point HP was the highest in the respective seat cushions 81, 91 of the examples 11, 12 and the comparative example 11. The respective seat cushions of the comparative example 11 and the example 12 had substantially the same pressure ratio.

Meanwhile, while a peak value of the pressure ratio of the seat cushion 81 of the example 11 was slightly higher than those of the comparative example 11 and the example 12, the pressure ratio of the example 11 was substantially the same as those of the comparative example 11 and the example 12 in the range F1 where the connection portion 813 is provided.

From the above-described results, it can be considered that even in the seat cushion 81 of the example 11 which had the same structure as the above-described embodiment, the seated passenger is prevented from feeling strange and uncomfortable by positioning the connection portion 813 at the point in front of the hip point HP.

Modified Example

Another placement structure of a rear seat according to a modified example will be described referring to FIG. 12. Herein, while FIG. 12 shows only a seat cushion 71 of the rear seat and its surrounding structure, any other structures, not illustrated, are the same as the above-described embodiment.

Figure 12:
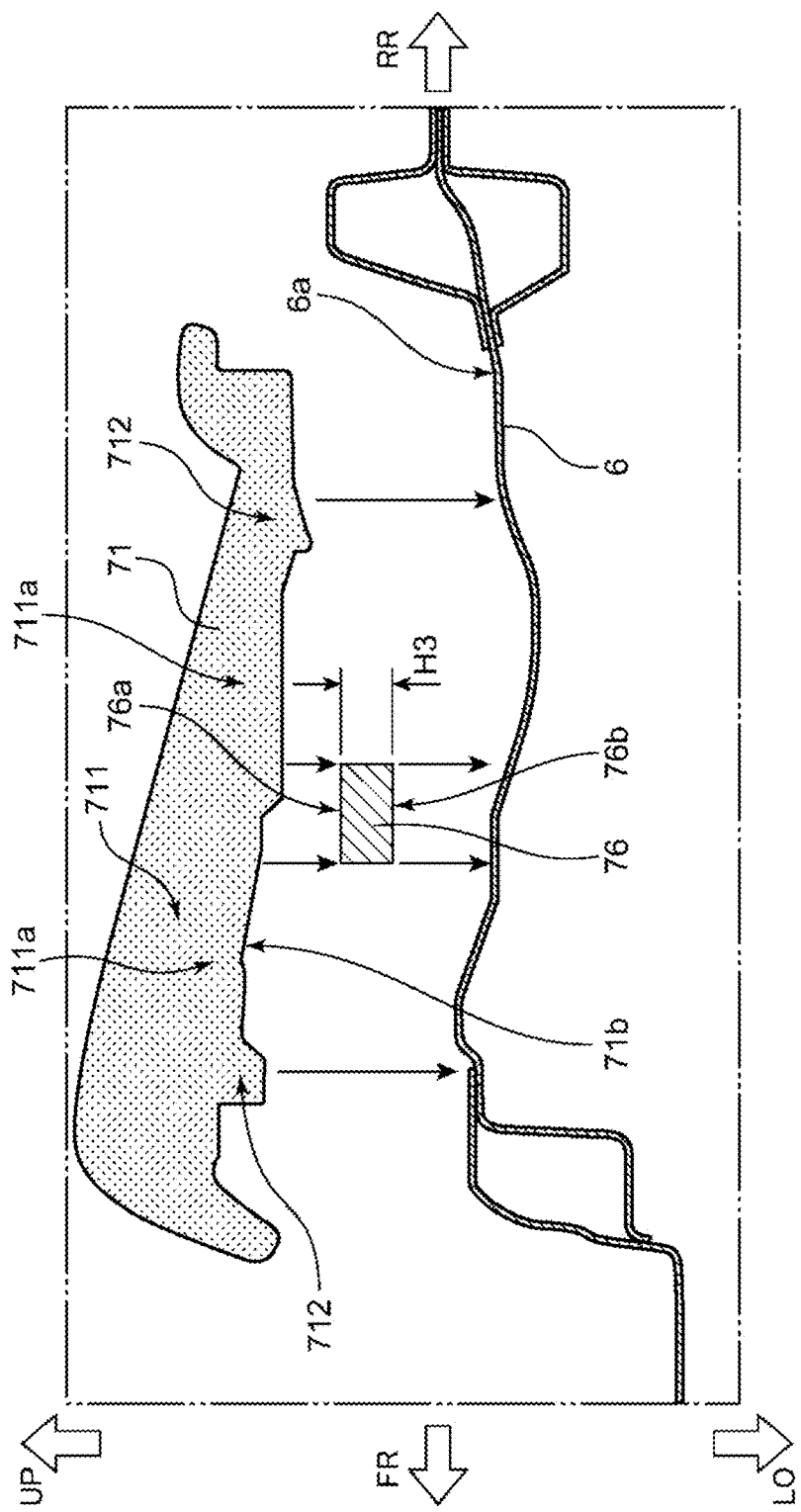
FIG. 12 is an exploded view showing a placement structure of a rea seat according to a modified example.

As shown in FIG. 12, the placement structure of the rear seat according to the modified example adopts a structure in which the seat cushion 71 is placed on the upper face 6a of the floor panel 6 with a connecting member 76 interposed therebetween. The seat cushion 71 is made of the urethane foaming material and formed integrally by a body pad portion 711 with a seat face and an outer peripheral edge portion 712 which protrudes downwardly from an outer peripheral edge of the body pad portion 711.

Herein, when the seat cushion 71 is placed on the floor panel 6, there occurs a gap of 20 mm between a lower face (an area except a portion where the outer peripheral edge portion 712 is provided) 71b of the seat cushion 71 and the upper face 6a of the floor panel 6.

The connecting member 76 is made of the urethane foaming material similarly to the seat cushion 71, and its height H3 is set to be 30 mm. That is, when the seat cushion 71 is placed on the floor panel 6, the connecting member 76 interposed therebetween is compressed in its height direction. Further, an upper face 76a of the connecting member 76 is made to contact (is connected to) a lower face 71b of the seat cushion 71, and its lower face 76b is made to contact (is connected to) the upper face 6a of the floor panel 6.

Herein, the respective arrangement positions of the connecting member 76 relative to the seat cushion 71 and the floor panel 6 are set to be the same as those of the above-described embodiment regarding the seat cushion 41.

In the present modified example, when the body pad portion 711 is placed on the floor panel 6 via the connecting member 76 interposed therebetween, an area between a portion where the connecting member 76 contacts and the outer peripheral edge portion 712 faces the upper face 6a of the floor panel 6 with a gap. This area of the body pad portion 711 corresponds to a separation portion 711a.

In the present modified example, its Young's modulus and loss coefficient are indicated in the flowing chart 2.

CHART 2

|  |  | Young's modulus MPa | Loss coefficient |
|---|---|---|---|
| Seat cushion | Urethane foaming material | 0.3 | 0.2 |
| Connecting member | Urethane foaming material | 0.2 | 0.5 |

While the placement structure of the rear seat according to the present modified example is different from the above-described embodiment in a structure in which the body pad portion 711 of the seat cushion 71 and the connecting member 76 are separated from each other, this modified example can obtain the same effect as the embodiment.

Further, since the body pad portion 711 and the connecting member 76 are separated from each other in the present modified example, the Young's modulus and the loss coefficient of the connecting member 76 can be set freely regardless of those of the body pad portion 711. Accordingly, an appropriate combination of these is possibly designed for the more vibration reduction of the floor panel 6.

Moreover, since the body pad portion 711 and the connecting member 76 are separated from each other in the present modified example, the hardness (Young's modulus) of the connecting member 76 relative to the hardness (Young's modulus) is set so lower (softer) that it can be suppressed more properly that the passenger feels hard and/or strange and uncomfortable when the passenger is seated.

Other Modified Example

While the above-described placement structure is adopted to the rear seat 4 of the front-and-rear two rows of seats 2-4 of the vehicle 1, the present invention is not limited to this. For example, the present placement structure is applicable to a third row seat in a vehicle having three rows of seats, which can obtain the same effect.

Moreover, since the seat cushion 41 capable of having three passengers seated is used in the above-described embodiment, the present invention is not limited to this. Any other structure in which separated seat cushions are provided for the passengers seated in the vehicle width direction (a structure in which captain seats are arranged in the vehicle width direction) can be used.

While the above-described embodiment adopts the body pad portion 411 and the connection portion 413 which have the same Young's modulus and loss coefficient, the Young's modulus and the loss coefficient of the connection portion can be set to be different from those of the body pad portion even if the structure in which the body pad portion and the connection portion are formed integrally is used in the present invention. For example, the Young's modulus and the loss coefficient can be made different by changing the foaming density, making two-colored portion, or the like.

While the arrangement position of the connection portion 413 of the seat cushion 41 are described referring to FIGS.

3 and 4 in the above-described embodiment, the present invention is not limited to this. That is, that is applicable as long as the connection portion and the connecting member are separated from the outer peripheral edge portion in the plan view of the seat cushion.

Additionally, while the connection portion 413 and the connecting member 76 are positioned in front of the hip point HP in the above-described embodiment and modified examples, the present invention is not limited to this. For example, even in a case where those are positioned at or in back of the hip point, the seated passenger's feeling strange and uncomfortable can be suppressed by setting the Young's modulus of the connection portion or the connecting member to be lower than that of the body pad portion.

What is claimed is:

1. A placement structure of a seat for a vehicle, comprising:
    a floor panel of the vehicle; and
    the seat for the vehicle comprises a seat cushion which is placed on the floor panel,
    wherein said seat cushion comprises a body pad portion which constitutes a portion including a seat face, an outer peripheral edge portion which is provided at an outer edge portion of the seat cushion in a plan view, when viewed in a vertical direction, protrudes toward said floor panel from said body pad portion, and contacts the floor panel, and a connection portion which is provided at a portion of the seat cushion which is inwardly separated from said outer peripheral edge portion in the plan view, protrudes toward the floor panel from the body pad portion, and connects the body pad portion and the floor panel,
    said body pad portion of the seat cushion has a separation portion which is provided in an area between said outer peripheral edge portion and said connection portion in the plan view, the separation portion being configured to be separated from the floor panel and face the floor panel with a gap, and
    said connection portion is configured such that a length, in the vehicle longitudinal direction, thereof is set to be ⅓ of a distance between a front-side part of said outer peripheral edge portion and a rear-side part of said outer peripheral edge portion or smaller.

2. The placement structure of the seat for the vehicle of claim 1, wherein said connection portion has a vibration loss coefficient of 0.01 or greater.

3. The placement structure of the seat for the vehicle of claim 1, wherein said connection portion is located substantially at a central position, in a vehicle longitudinal direction, between a front-side side part of said outer peripheral edge portion and a rear-side part of said outer peripheral edge portion.

4. The placement structure of the seat for the vehicle of claim 1, wherein said connection portion is located substantially at a central position, in a vehicle width direction, of said seat cushion.

5. The placement structure of the seat for the vehicle of claim 1, wherein said connection portion is located in front of a hip point of the seat cushion in the vehicle longitudinal direction.

6. The placement structure of the seat for the vehicle of claim 5, wherein said connection portion is located substantially at a central position, in the vehicle longitudinal direction, of the seat face of said seat cushion.

7. The placement structure of the seat for the vehicle of claim 1, wherein said connection portion is configured to have substantially the same Young's modulus as said body pad portion.

8. A placement structure of a seat for a vehicle, comprising:
    a floor panel of a vehicle; and
    a seat for the vehicle comprising a seat cushion which is placed on the floor panel,
    wherein said seat cushion comprises a body pad portion which constitutes a portion including a seat face and is configured such that a lower face thereof is separated from said floor panel and faces said floor panel with a gap and an outer peripheral edge portion which is provided at an outer edge portion of the seat cushion in a plan view, when viewed in a vertical direction, protrudes toward said floor panel from said body pad portion, and contacts the floor panel,
    said placement structure of the seat for the vehicle further comprises a connecting member which is provided between the lower face of said body pad portion and an upper face of said floor panel at a portion which is separated from said outer peripheral edge portion of the seat cushion in the plan view so as to connect the body pad portion and the floor panel, and
    said connecting member is configured such that a length, in the vehicle longitudinal direction, thereof is set to be ⅓ of a distance between a front-side part of said outer peripheral edge portion and a rear-side part of said outer peripheral edge portion or smaller.

9. The placement structure of the seat for the vehicle of claim 8, wherein said connecting member is configured to have a smaller Young's modulus than said body pad portion.

10. The placement structure of the seat for the vehicle of claim 1, wherein said seat cushion is configured such that part of a resonance frequency of said seat cushion substantially matches part of a resonance frequency of said floor panel.

11. The placement structure of the seat for the vehicle of claim 8, wherein said seat cushion is configured such that part of a resonance frequency of said seat cushion substantially matches part of a resonance frequency of said floor panel.

* * * * *